United States Patent [19]
Injeyan et al.

[11] Patent Number: 6,069,730
[45] Date of Patent: May 30, 2000

[54] PHASE CONJUGATED MASTER OSCILLATOR-POWER AMPLIFIER BREAKDOWN CONTROL

[75] Inventors: Hagop Injeyan, Glendale; Randall J. St. Pierre, Santa Monica; Mark E. Weber, Hawthorne, all of Calif.

[73] Assignee: TRW Inc., Redondo Beach, Calif.

[21] Appl. No.: 09/134,466

[22] Filed: Aug. 14, 1998

[51] Int. Cl.[7] .................................................... H01S 3/00
[52] U.S. Cl. .............................................. 359/334; 372/33
[58] Field of Search ................................... 359/334, 338, 359/348; 372/33

[56] References Cited

U.S. PATENT DOCUMENTS

| | | |
|---|---|---|
| 3,679,999 | 7/1972 | Chernoch . |
| 4,127,827 | 11/1978 | Barry . |
| 4,730,324 | 3/1988 | Azad . |
| 4,734,911 | 3/1988 | Bruesselbach . |
| 4,852,109 | 7/1989 | Kuchar . |
| 4,949,346 | 8/1990 | Kuper et al. . |
| 4,984,246 | 1/1991 | Cabaret et al. . |
| 5,034,950 | 7/1991 | Jackel et al. ............................. 372/21 |
| 5,239,408 | 8/1993 | Hackel et al. ........................ 359/338 |
| 5,271,031 | 12/1993 | Baer . |
| 5,305,345 | 4/1994 | Albrecht et al. . |
| 5,307,430 | 4/1994 | Beach et al. . |
| 5,317,585 | 5/1994 | Gregor . |
| 5,351,251 | 9/1994 | Hodgson . |
| 5,394,420 | 2/1995 | Senn et al. . |
| 5,441,803 | 8/1995 | Meissner . |
| 5,548,606 | 8/1996 | Senn et al. . |
| 5,555,254 | 9/1996 | Injeyan et al. . |
| 5,646,773 | 7/1997 | Injeyan et al. . |
| 5,651,021 | 7/1997 | Richard et al. . |

*Primary Examiner*—Mark Hellner
*Attorney, Agent, or Firm*—Michael S. Yatsko

[57] ABSTRACT

A system and method for monitoring the mode of an input beam to a phase conjugated master oscillator power amplifier (PC MOPA). In order to prevent catastrophic optical damage to the MOPA components, the method and system shuts down the master oscillator when a multi-mode input beam is detected.

31 Claims, 6 Drawing Sheets

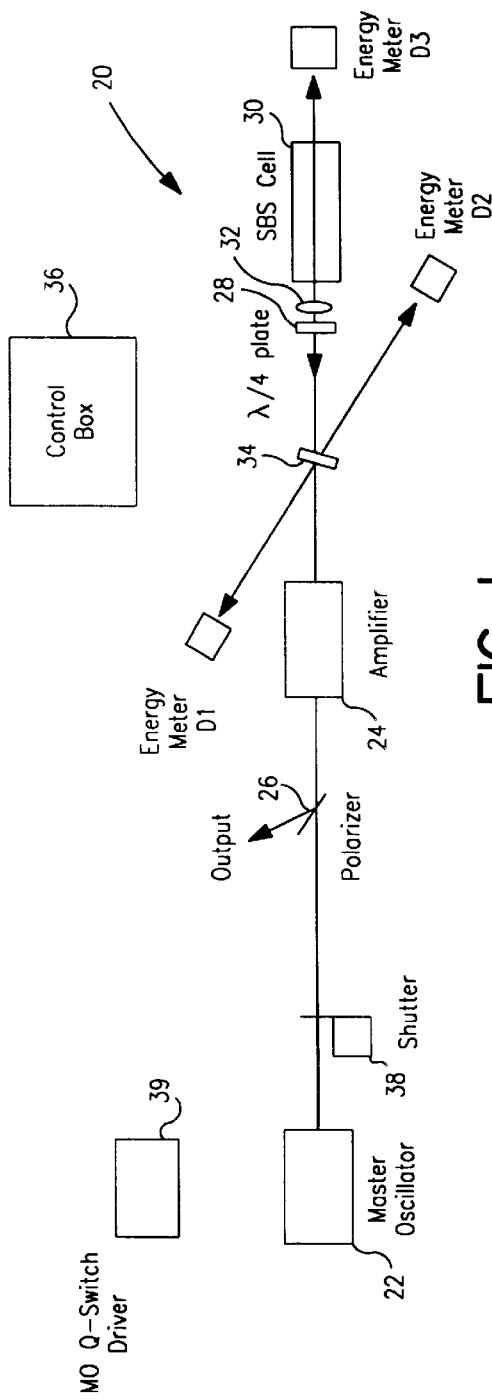
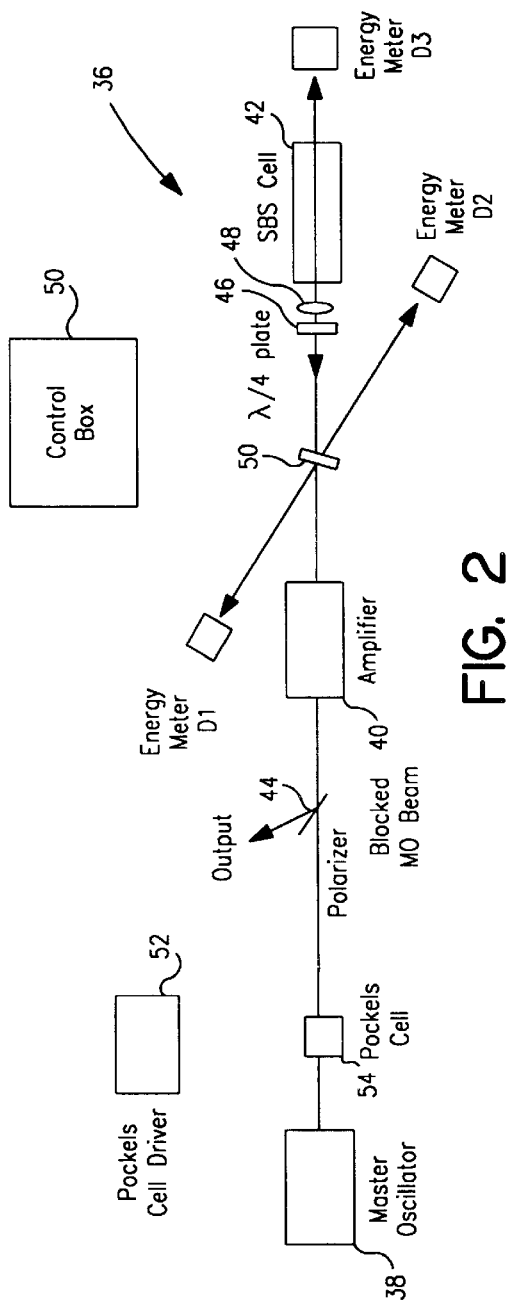

PHASE CONJUGATED MASTER OSCILLATOR-POWER AMPLIFIER BREAKDOWN CONTROL

BACKGROUND OF THE INVENTION

1. Field of the Invention

The present invention relates to a system and method for monitoring the input beam of a phase conjugated master oscillator power amplifier (PC MOPA) and shutting down the PC MOPA when its operation becomes multi-mode to prevent catastrophic damage of the MOPA components.

2. Description of the Prior Art

A master oscillator power amplifier (MOPA) architecture is known to be used in laser systems, such as solid-state laser systems, and provides a convenient and powerful way to scale the brightness of such laser systems. Solid-state MOPAs are known to include a master oscillator and an optical amplifier, known as a zig-zag amplifier. A primary laser signal from the master oscillator is amplified by the zig-zag amplifier to provide a relatively high average power output signal. The master oscillator normally includes a diode pumped, solid-state medium, a total reflector and an outcoupler for providing a primary laser signal. Examples of such solid-state lasers are disclosed in U.S. Pat. Nos. 3,679,999; 4,730,324; 4,852,109; 4,949,346; 4,984,246; 5,271,031; 5,305,345; 5,317,585; 5,351,251; 5,646,773; 5,555,254 and 5,307,430.

In order to improve the performance of such laser systems, phase conjugated MOPAs (PC MOPA) have been developed, for example, as disclosed in U.S. Pat. Nos. 4,734,911 and 5,555,254.

For solid-state lasers, the use of PC MOPAs has led to kilowatt class lasers with near diffraction limited beam quality. In most solid-state PC MOPA lasers, the phase conjugation medium is known to be a stimulated Brillouin scattering cell (SBS), for example as disclosed in commonly owned copending patent application Ser. No. 08/697,649 filed on Aug. 28, 1996, entitled "Ozone Compatible Stimulated Brillouin Scattering Materials, by Hagop Injeyan and Randall J. St. Pierre. Such SBS cells are known to provide outstanding performance in response to a single longitudinal mode input beam but suffer optical breakdown at modest energies with multi-longitudinal mode lasers. This breakdown can cause severe aberrations in the SBS medium leading to catastrophic optical damage of the MOPA components. Thus, there is a need for monitoring and shutting down lasers when the input beam to the PC MOPA is no longer single mode.

SUMMARY OF THE INVENTION

Briefly, the present invention relates to a system and method for monitoring the mode of an input beam to a phase conjugated master oscillator power amplifier (PC MOPA). In order to prevent catastrophic optical damage to the MOPA components during multi-mode conditions, the method and system in accordance with the present invention shuts down the laser when a multi-mode input beam is detected in order to prevent catastrophic optical damage to the MOPA components.

DESCRIPTION OF THE DRAWINGS

These and other advantages of the present invention will be readily understood with reference to the following specification and attached drawing, where:

FIG. 1 is a block diagram of a phase conjugated master oscillator power amplifier (PC MOPA) with a stimulated Brillouin scattering cell (SBS) breakdown control system with a Q-switch master oscillator shutoff in accordance with the present invention;

FIG. 2 is an alternate embodiment of the invention, similar to FIG. 1 except illustrating the use of an external Pockels cell;

DETAILED DESCRIPTION

The present invention relates to a system and method for preventing catastrophic optical damage to components of an optical circuit which utilizes a stimulated Brillouin scattering (SBS) cell, such as a phase conjugated master oscillator power amplifier (PC MOPA), which can result during unintended multi-mode operation. As mentioned above, such PC MOPAs are known to use a stimulated Brillouin scattering (SBS) cell as a phase conjugation medium. Such SBS cells are known to break down at modest energies when subjected to multi-longitudinal mode beams. The break down is known to cause severe aberrations in the SBS cell leading to catastrophic optical damage of the MOPA components. More particularly, when an input beam to the SBS cell becomes multi-mode, the SBS reflectivity is known to drop causing the transmission through the SBS cell to increase significantly. Depending upon the input energy and the SBS material used, breakdown of the SBS medium may occur. Catastrophic damage typically occurs on pulses subsequent to the pulse that initiated the breakdown. In order to prevent damage to the optical components of a MOPA, the system and method in accordance with the present invention monitors the energy level of the input beam transmitted to, or reflected from the SBS cell. A significant change in energy is used to shut down the master oscillator to prevent damage to the system.

Figure 3:
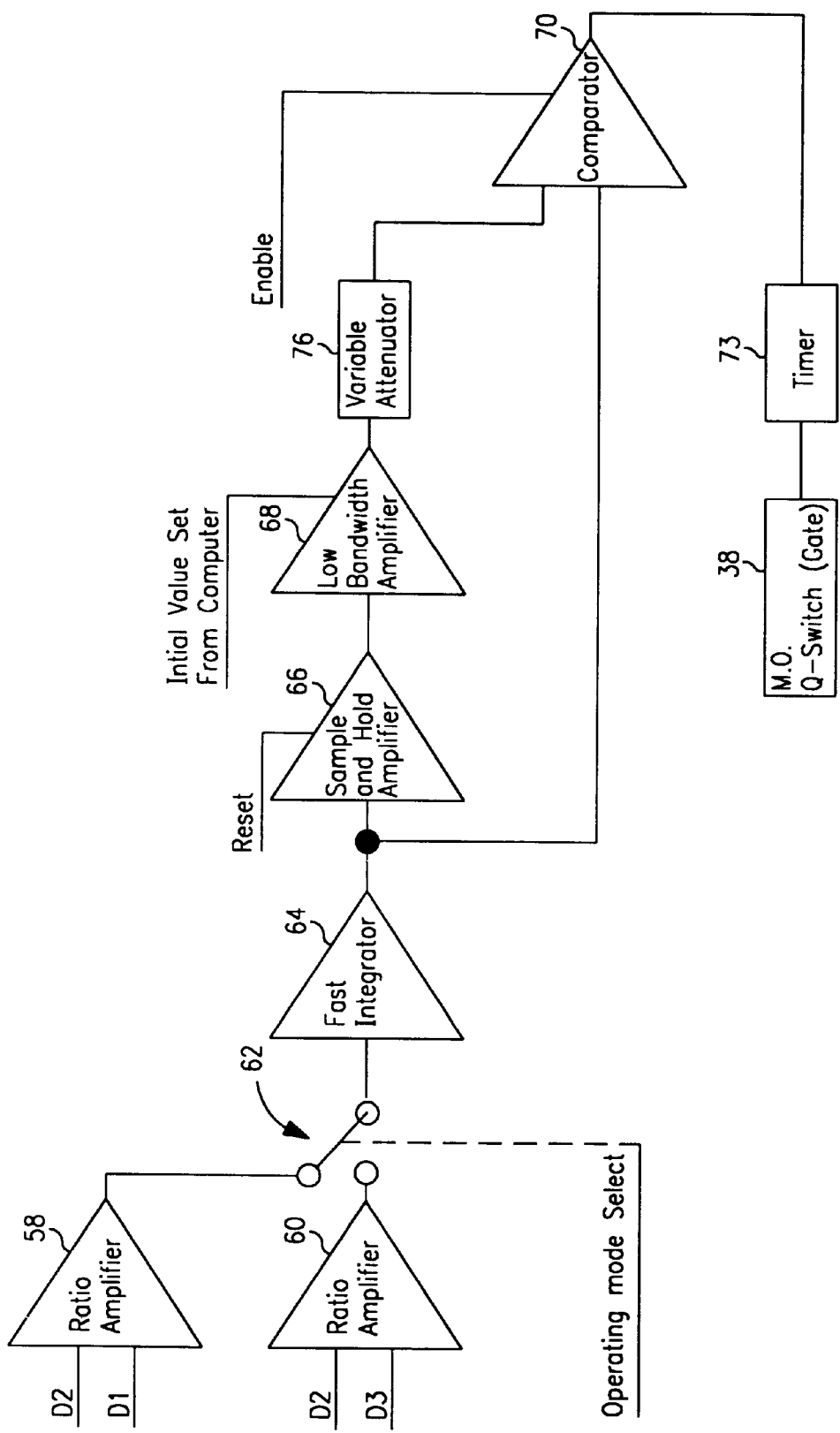
FIG. 3 is a schematic diagram of the control box electronics for use with the embodiments of the present invention illustrated in FIGS. 1 and 2.
Figure 4:
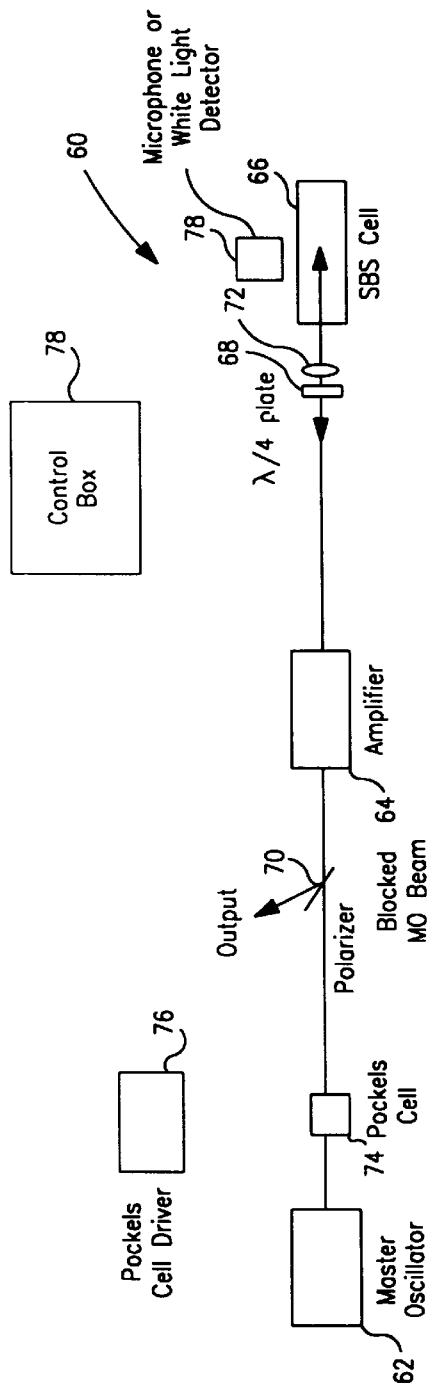
FIG. 4 is another alternate embodiment of the invention which utilizes acoustic or white light detection and an external Pockels cell.
Figure 5:
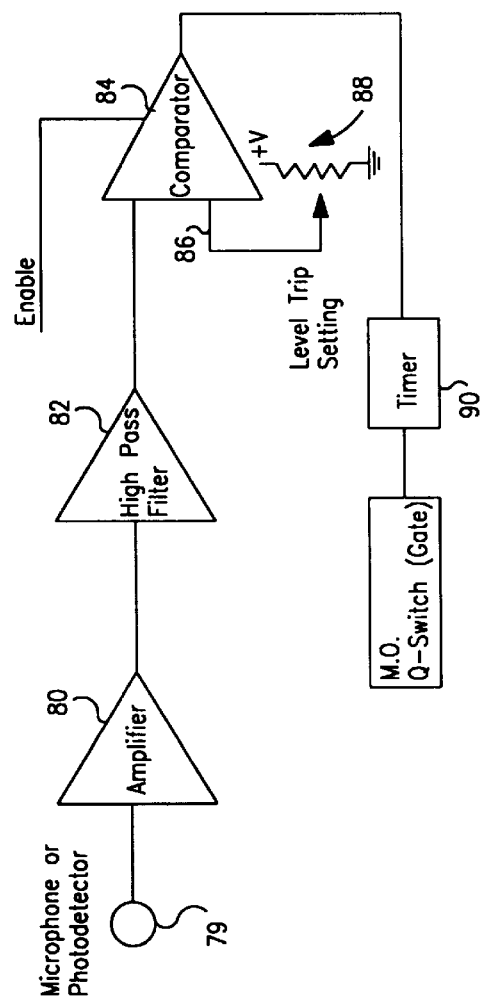
FIG. 5 is a schematic of the control box electronics for the embodiment illustrated in FIG. 4.
Figure 6:
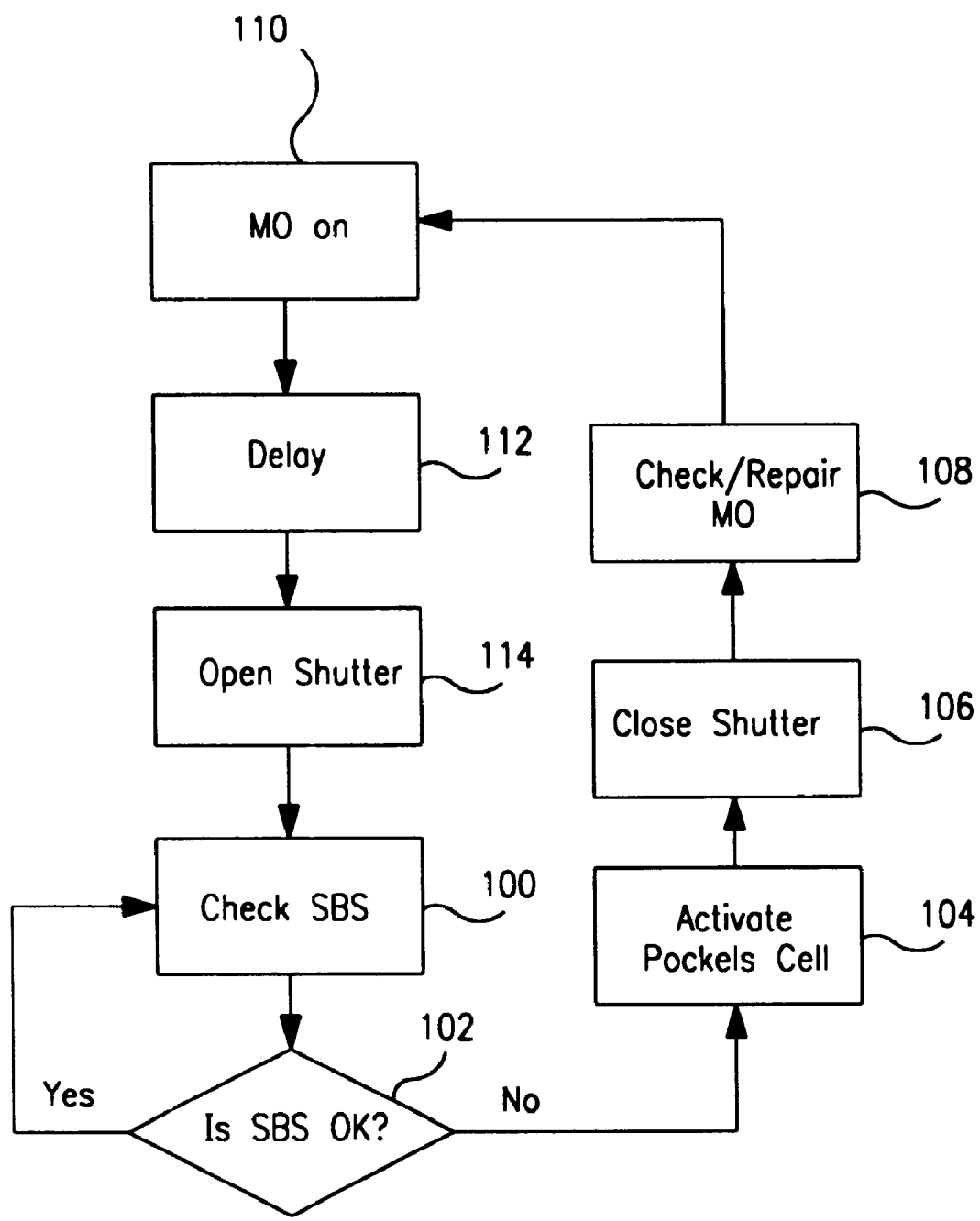
FIG. 6 is a functional flow diagram for the control box illustrated in FIG. 5.
Figure 7:
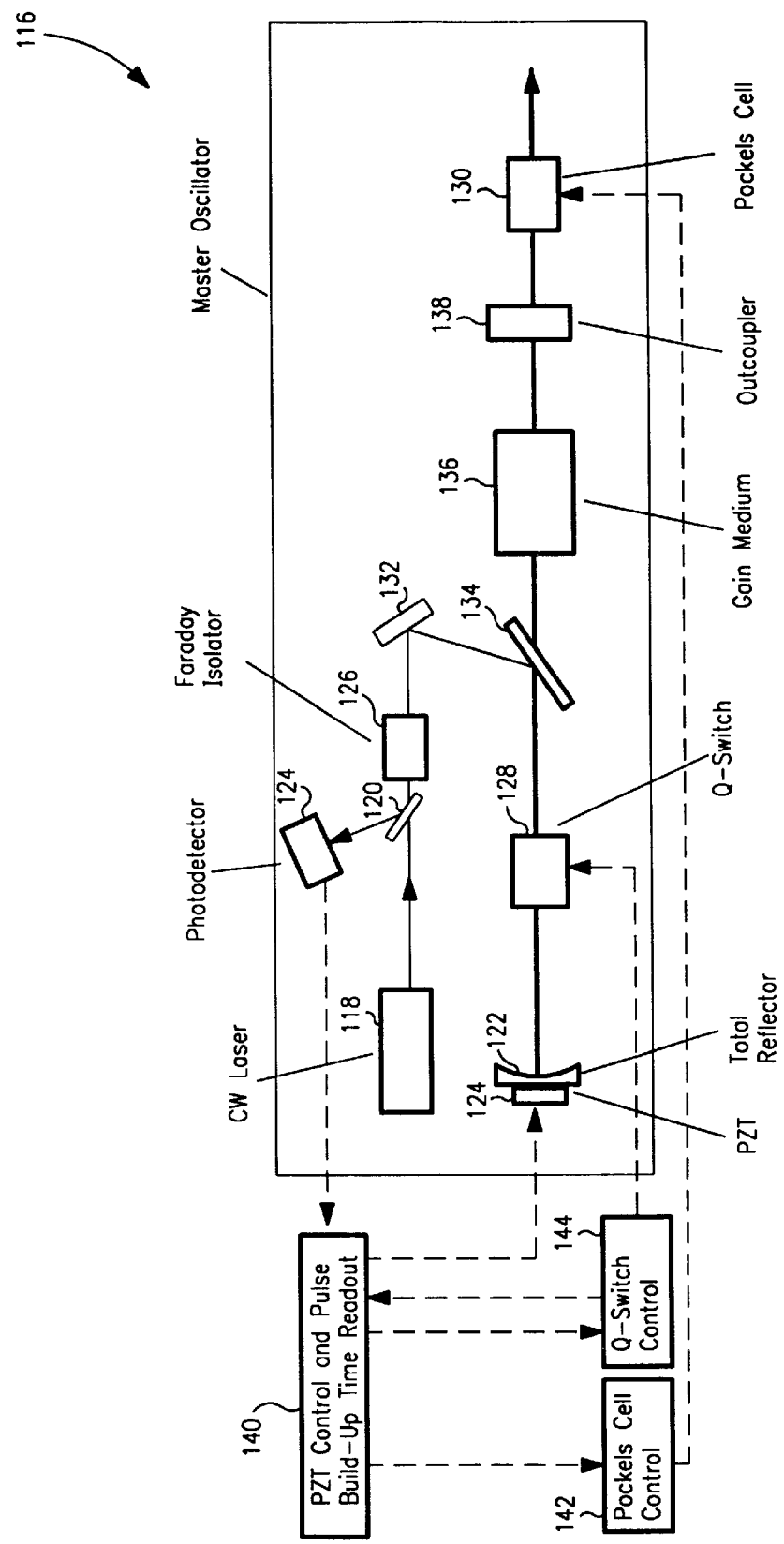
FIG. 7 is another alternate embodiment of the invention based upon pulse build up time for an injection seeded laser.
Figure 8:
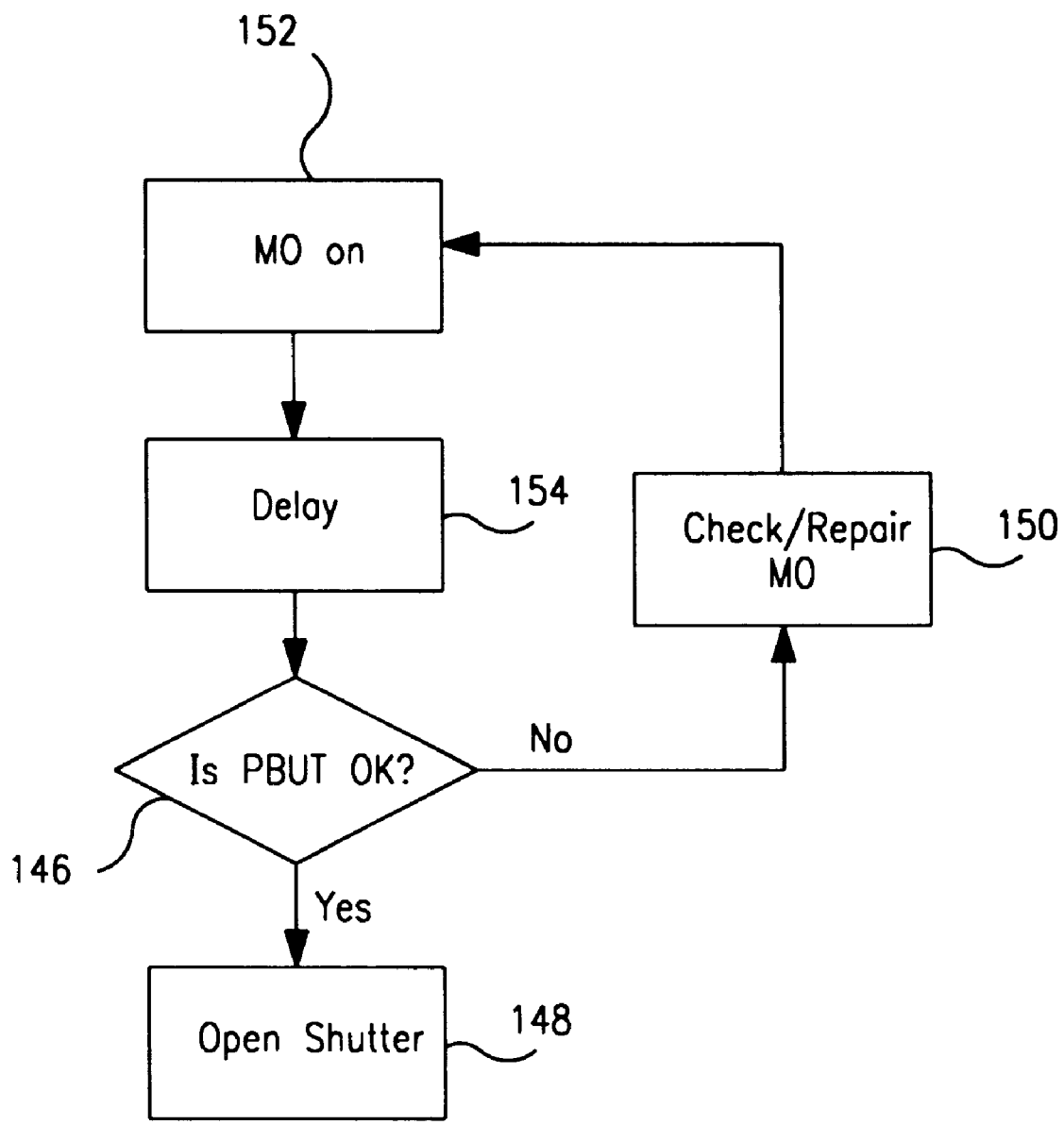
FIG. 8 is a functional flow diagram of the system illustrated in FIG. 7.

Various embodiments of the invention are illustrated. FIGS. 1 and 2 illustrate embodiments in which photodetectors or energy meters are used to sample the incident, transmitted and reflected energy from the SBS cell. Should a significant change be detected in either the transmitted or reflected energy, the master oscillator is shut off. In FIG. 1, the MOPA is shut off by way of a master oscillator Q-switch while in FIG. 2 the beam from MOPA is diverted from the power amplifier by way of a Pockels cell, located between the master oscillator and the power amplifier. FIG. 3 is a control schematic for controlling either the Q-switch illustrated in FIG. 1 or the Pockels cell illustrated in FIG. 2. FIG. 4 is an alternate embodiment of the invention in which a microphone or white light detector is used to sense breakdown of the SBS cell. FIG. 5 is a control schematic for the embodiment illustrated in FIG. 4, while FIG. 6 is a functional flow diagram for the embodiment illustrated in FIG. 5. FIG. 7 is an alternate embodiment based upon the pulse build up time of an injection seeded laser while FIG. 8 is a functional flow diagram of the embodiment illustrated in FIG. 7.

As mentioned above, when an SBS cell is subjected to a multi-mode incident beam, the reflectivity from the SBS cell drops while the transmission increases. The reflectivity of the SBS is a function of the input energy. Since the laser may be set to operate at a variety of various frequencies, an important aspect of the invention is monitoring a sudden change in reflectivity of the SBS cell from one pulse to the next. The contrast in reflectivity should be optimized between a single mode pulse and a multi-mode pulse. For a laser operating near the SBS threshold, the reflected energy from the SBS cell will provide the most contrast. However, if the laser is operating at many times above the threshold, the transmitted energy will offer the most contrast as discussed below. In general, the SBS reflectance is provided by the following equation:

$$E_r = R_S(E_i - E_{th})$$

where $E_r$ is the reflected energy, $R_S$ is the SBS slope efficiency, $E_i$ is the input energy and $E_{th}$ is the SBS threshold energy.

For a typical SBS material, such as perfluorodimethyl cyclohexane, the SBS slope efficiency $R_S$ and the SBS threshold energy $E_{th}$ may be, for example, 0.95 and 4 mJ, respectively, for a single mode input and 0.85 and 7 mJ for a multi-mode input. Under these circumstances, if the input energy is twice the threshold energy (i.e., 8 mJ input), the reflected light is 3.8 mJ for single mode vs. 0.95 mJ for multi-mode (a ratio of 4), whereas the transmitted light for single mode and multi-mode is 4.2 and 7.05 mJ, respectively (a ratio of 1.67). On the other hand, at one hundred times the threshold, the reflected energies are 376 and 334 mJ for single mode and multi-mode respectively (ratio of 1.12) whereas the transmitted energies are 24 and 66 mJ respectively for a ratio of 2.75. Thus, in order to optimize the contrast, the reflected energy may be used in the first example and the transmitted energy in the second example.

Turning to FIG. 1, a phase conjugated master oscillator-power amplifier (PC MOPA) is shown with stimulated Brillouin scattering (SBS) cell breakdown control which utilizes a Q-switch for shutting down the master oscillator when a significant change in the transmitted or reflected energy from the SBS cell is detected. The PC MOPA, generally identified with the reference numeral 20, includes a master oscillator 22 for generating, for example, a primary laser signal. The primary laser signal is directed to a power amplifier 24 where it is amplified during a first pass. The output beam from the power amplifier 24 is directed to a stimulated Brillouin scattering (SBS) cell 30 where the amplified beam from the power amplifier 24 is phase conjugated and reflected back along the same optical path as the incident beam and is thus reflected back through the power amplifier 24 in a second pass. A polarizer 26 and a quarter wave plate 28 are used as an optical isolator to separate the output beams after the second pass through the power amplifier 24 from the master oscillator 22. As mentioned above, the SBS cell 30 provides phase conjugation of the output beam from the power amplifier to correct, for example, wavefront distortions resulting from the power amplifier. A focusing lens 32 may be disposed between the SBS cell 30 and the quarter wave plate 28, for focusing the incident beam onto the SBS cell 30. A beam splitter 34 is used to sample the incident and reflected beams from the SBS cell 30. The beam splitter 34 may be, for example, an anti-reflection (AR) coated wedge.

A pair of energy meters or photodetectors D1 and D2 are coupled to the beam splitter 34 and are used to measure the incident and reflected energy from the SBS cell 30. A third energy meter or photodetector D3, coupled to the SBS cell 30 as shown, may be utilized for detecting transmitted energy through the SBS cell 30. As mentioned above, reflected energy from the SBS cell decreases while transmitted energy increases in response to a multi-mode incident light beam. These changes in energy levels are used to detect a sudden change in either reflected or transmitted energy levels by a control box 36, which, in turn, controls a shutter 38 and a Q-switch driver 39. As will be discussed in more detail below, when sudden changes in the transmitted or reflected energy from the SBS cell 30 are detected, the master oscillator 22 is shut down by the Q-switch (not shown), located inside the master oscillator 22 under the control of the Q-switch driver 39 and control box 36 to prevent damage to the optical components forming the PC MOPA 20.

An alternate embodiment of the invention is illustrated in FIG. 2. This embodiment is similar to the embodiment illustrated in FIG. 1, except that it uses a Pockels cell for diverting the laser beam away from the power amplifier 40 when sudden changes in the transmitted or reflected energy from the SBS cell is detected. In this embodiment, the PC MOPA, generally identified with the reference numeral 36, includes a master oscillator 38, a power amplifier 40, an SBS cell 42, an optical isolator formed from a polarizer 44 and quarter wave plate 46 and may include a focusing lens 48. Similar to the embodiment illustrated in FIG. 1, a beam splitter 50 is used to sample the incident and reflected beams from the SBS cell 42. The energy meters or photodetectors D1 and D2 may be used to measure the reflected and incident beams to the SBS cell. An energy meter D3 may also be used to detect the transmitted energy through the SBS cell. Similar to the embodiment illustrated in FIG. 1, when a significant change in the transmitted or reflected energy from the SBS cell 42 is detected, a control box 50 generates an electronic signal which is applied to a Pockels cell driver 52, which, in turn, is used to activate a Pockels cell 54 disposed at the output of the master oscillator 38 to block the master oscillator output signal.

FIG. 3 illustrates a control schematic which may be used for the control boxes 36 and 50 in connection with the embodiments illustrated in FIGS. 1 and 2 respectively. As mentioned above, three energy detectors D1, D2 and D3 are used to detect the energy of the incident, reflected and transmitted beams through the SBS cells 30 and 42. The contrast in the ratios for the single mode and multi-mode conditions vary as a function of the operating condition of the laser. As such, a pair of ratio amplifiers 58 and 60 is provided. The energy signals from the energy detectors D1 and D2 are supplied to the ratio amplifier 58 while the energy signals from the energy detectors D2 and D3 are applied to the ratio amplifier 60. The two ratio amplifiers 58 and 60 provide coverage of the entire spectrum of the power range of the laser. For relatively high-power laser output, the ratio D1/D2 may be used to provide the optimum contrast. For low-power output, the ratio D3/D2 may be used. A single pole double-throw switch 62 may be used to select between the two operating modes. The switch 62 may be any type of electronic or other type of switch. The switch 62 is under the control of an OPERATING MODE SELECT signal. This signal may be provided by an external source, either manually or under computer control. As discussed above, this switch 62 is set depending on whether the SBS cell is operated near its threshold (i.e., twice the threshold energy), or many times higher than the threshold (i.e., 100 times higher than the threshold). For each laser pulse, the ratio is obtained from one of the relatively high speed ratio amplifiers 58, 60, depending on the position of the switch 62 and integrated by a fast integrator 64 on a pulse-by-pulse basis.

The energy ratio for each laser pulse is compared with previous pulses to determine if a significant change has occurred. More particularly, this is done by comparing each pulse with the average of the previous, for example, one to two seconds of pulses. A sample and hold amplifier 66 and a low bandwidth amplifier 68 is used to obtain the average of the pulses over a relatively short time period, such as a few seconds. More particularly, the output of the fast integrator 64 is applied to one side of a gated comparator 70. The output of the fast integrator 64 is also applied to the sample and hold amplifier 66. The sample and hold amplifier 66 is reset, for example, under computer control after each laser pulse. The output of the sample and hold amplifier 66 is applied to a low bandwidth filter amplifier 68 a frequency response on the order of a few hertz. The low bandwidth amplifier is provided with a port to allow a value to be preset into it at startup to provide a best guess average based upon the requested laser output power. A suitable low bandwidth amplifier 68 is available as model no. OP-07 from Precision Monolithics in Santa Clara, Calif. A variable attenuator 71 may be used for scaling the output value from the low bandwidth amplifier 68 to a predetermined value (i.e. 10–20%) less than the pulse-to-pulse value. Thus, for a negative going change greater than this amount, the comparator 70, which is enabled at the end of every laser pulse under computer control, for example, one microsecond, enables a timer 73 or Pockels cell directly. More particularly, the output of the comparator 70 is used to drive either the Q-switch or Pockels cell 54 as discussed below.

More particularly, a master oscillator may go multi-mode for a number of reasons. In some circumstances, the change may be temporary, for example, due to changes in the laser environment. In yet other circumstances the change may be permanent as in the case of a seeded master oscillator when the seeder is disabled. If the master oscillator is disabled and restarted, it may take several minutes for it to stabilize. During this time, a secondary shutter, for example, the shutter 38 must be used to block the beam from going into the SBS cell 30. On the other hand, if a Pockels cell is used as illustrated in FIG. 2, the system may be restarted after a short time (for example, a few seconds) to check for breakdown again and if the condition persists, (i.e., multimoding is still present then a permanent shutoff may be initiated). Thus, in the case of the Q-switch, the output of the comparator 70 is applied to a timer 73. When the timer 73 has been set as discussed above, the Q-switch under the control of the Q-switch driver 39 enables a predetermined number of output pulses from the master oscillator 22 and allows the SBS cells to recover or the system shuts down the laser permanently.

It should be understood by those of ordinary skill in the art that the schematic illustrated in FIG. 3 is merely functional and although shown in hardware may also be implemented in software or software or a combination of both. A functional flow chart for the system illustrated in FIG. 3 is illustrated in FIG. 6. As mentioned above, prior to turning on the MOPA 20 or 36 as discussed above, an OPERATING MODE SELECT signal is selected either by external hardware or by computer control to select the operating mode for the MOPA 20, 36. Once the MOPA 20, 36 is operational, a RESET signal is generated after each pulse to reset the sample and hold amplifier 66. Each pulse of the MOPA 20, 32 may be monitored by monitoring the voltage output of the ratio amplifier 58, 60 since a ratio voltage will be available at these outputs after each pulse. Once the MOPA 20, 32 is on, the system constantly checks the status of the SBS cell 32, 42 as indicated by the blocks 100 and 102. As indicated above, depending on the position of the switch 62, the status of the SBS cells 30 and 42 are monitored by monitoring the ratio of either the transmitted energy to the incident energy or the ratio of the reflected energy to the incident energy, for example, by way of the ratio amplifiers 58 and 60. These ratio signals, as discussed above, are compared by way of a comparator 70. The comparator 70, upon detection of a ratio above a suitable threshold is used to either activate the Q-switch driver 39 to close the Q-switch (not shown) or to activate the Pockels cell 54 by way of the Pockels cell driver 52 as indicated by the block 104. In the case of the embodiment illustrated in FIG. 1, the system also closes the shutter 38 in step 106 to enable the master oscillator 22 to stabilize after the master oscillator is repaired or fixed as indicated in step 108 and turned back on as indicated in step 110. In the case of the embodiment illustrated in FIG. 1, the shutter 38 is maintained in a closed position for a predetermined amount of time, for example, as controlled by the timer 73 (FIG. 3) as indicated by the step 112 to enable the master oscillator 22 time to stabilize at which time the shutter 38 is opened in step 114. After that point, as mentioned above, the system continuously checks the status of the SBS cells 30 and 42. For an embodiment as illustrated in FIG. 2 which utilizes the Pockels cell 54, no stabilization time is required since the Pockels cell 54 merely diverts the beam away from the amplifier 40.

Another alternate embodiment of the method and system in accordance with the present invention is illustrated in FIG. 4. In this embodiment, a PC MOPA, generally identified with the reference numeral 60, is illustrated. The PC MOPA 60, similar to the embodiments illustrated in FIGS. 1 and 2, includes a master oscillator 62, a power amplifier 64, an SBS cell 66, an optical isolator which includes, for example, a quarter wave plate 68 and a polarizer 70, as well as a focusing lens 72. A Pockels cell 74 is disposed between the power amplifier 64 and the master oscillator 62. The Pockels cell 74 is driven by a Pockels cell driver 76, which, in turn, is driven by a control box 78. The control box 78 is illustrated in FIG. 5 and discussed in detail below. In this embodiment, a fast microphone 78 may be disposed near the SBS cell 66 to detect an acoustic signal resulting from the breakdown of the SBS cell 66. Alternatively, a white light detector may be used and placed near the focal point to detect white light emitted from plasma formed by the breakdown of the SBS cell. In this embodiment, the control box 78 must distinguish between a signal due to breakdown or other factors. Light baffles may be used to eliminate external like sources for embodiments using the white light detector. Similarly, external acoustic noise may be filtered out electronically using a high pass filter.

The control box 78 is shown schematically in FIG. 5. In this embodiment, the output from the microphone or white light detector 79 is applied to a fast amplifier 80 and a high pass filter 82. A comparator 84 is used to establish the threshold for a disabling signal. This threshold may be established by way of a reference signal 86, which may be provided by way of a potentiometer 88 and a reference voltage +V, as shown. As in the embodiments illustrated above, a timer 90 may be provided to enable the Q-switch to be disabled for a predetermined amount of time to allow the SBS cell 66 to recover or to shut it off permanently.

Another alternate embodiment of the invention is illustrated in FIG. 7 and generally identified with the reference numeral 116. This embodiment is based on an injection seeding technique for getting a Q-switched master oscillator to run in a single mode. In this embodiment, the master oscillator, identified with the reference numeral 116, includes a relatively low power continuous wave (CW) laser 118. In injection seeded master oscillators, the low power CW laser 118 is used to provide one of the cavity modes a significant advantage during the pulse build up process to enable that mode to dominate over all other modes thus providing a single mode output. In particular, the CW laser 118 signal is typically injected into a laser cavity by way of a polarizer 120. The cavity length is controlled so that the seeder is resonant with the cavity mode. In particular, the cavity length is controlled by mounting a master oscillator total reflector 122 on a piezoelectric transducer 124 and dithering the total reflector 122 to minimize the pulse buildup time (PBUT). The PBUT is measured by way of a photodetector 124, for example, a photodiode, which samples the intercavity beam by way of a small reflection from the polarizer 120. A Faraday isolator 126, disposed in front of the seeder, extracts this small reflection and directs it toward the photodetector 124. When the laser is properly seeded and running in single mode, the pulse build up time is low, on the order of a pulse length; however, if the seeder if off resonance or disabled, the pulse build up time is on the order of two to three pulse lengths. As such, the pulse build up time may be used as a measure for monitoring single mode operation.

Seeder manufactures, such as Lightwave Electronics of Mountain View, Calif., provide electronic controls for controlling the cavity length and providing a readout of the pulse build up time. Should the pulse build up time become significantly longer than a pulse length, the master oscillator 116 can be shut off using a Q-switch 128 and by way of a Pockels cell 130 or a mechanical shutter, as discussed above.

In this embodiment, a totally reflecting mirror 132, disposed adjacent to the Faraday isolator 126, is used to reflect the signal from the Faraday isolator 126 to another polarizer 134 which directs the signal from the laser 118 to the main cavity which includes the reflector 122, a Q-switch 128, a gain medium 136 and an outcoupler mirror 138. As mentioned above, a Q-switch 128 may be mounted, for example, between the reflector 122 and the polarizer 134. The Pockels cell 130 may be disposed outside the main cavity, for example, adjacent the outcoupler mirror 138.

In this embodiment, the pulse build up time is minimized through dithering process, however, it cannot be performed on a single shot basis and is usually performed by averaging a number of pulses. For example, the laser may operate at 2 kilohertz but the PZT update may be 100 to 500 hertz. This technique is more suited for monitoring single mode operation during turn on when the shutter to the amplifier train is closed. In this embodiment, the pulse build up signal is indicated by the control block 140 is used to control either a Pockels cell driver, indicated by the block 142, or a Q-switch driver, indicated by the block 144. As indicated above, the pulse build up control block 144 is available from Lightwave Electronics of Mountain View, Calif. The Pockels cell driver and Q-switch driver are commonly known and are available from various sources including INRAD of New Jersey and Quantum Electronics of Florida.

A functional block diagram of the system illustrated in FIG. 7 is illustrated in FIG. 8. As indicated above, the system may be implemented in hardware or software and still be within the broad aspects of the invention. Referring to FIG. 8, the system continuously checks the pulse build up time in step 146. If the pulse build up time indicates a single mode operation the shutter (not shown) is open in step 148 after the master oscillator has had time to stabilize after initially being turned on. Should the pulse build up time indicate other than a single mode operation, the control block 140 signals the Pockels cell driver 142 and/or the Q-switch driver 144 to close the Q-switch 128 and/or activate the Pockels cell 130 to divert the beam. Subsequently, after the system 116 is repaired, as indicated by block 150, the Q-switch 128 and the Pockels cell 130 are reconfigured for normal operation as indicated by the block 118. In embodiments which employ a Q-switch, a mechanical shutter may be disposed adjacent the out-coupler to allow sufficient time for the master oscillator to stabilize. In such embodiments, the shutter is delayed as indicated by the block 120, 154 to enable the master oscillator efficient time to stabilize.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A system for protecting an optical circuit which includes a stimulated Brillouin scattering (SBS) cell from optical damage as a result of a multi-mode input the system comprising:

first measuring means for measuring the transmitted energy through the SBS cell; and means for shutting down the circuit as a function of said transmitted energy.

2. The system as recited in claim 1, further including second measuring means for measuring the reflected energy from said SBS cell.

3. The system as recited in claim 1, further including third measuring means for measuring the incident energy to said SBS cell.

4. The system as recited in claim 3, further including first determining means for determining the ratio of the transmitted energy to incident energy for successive pulses and generating a shutdown signal to said shutting down means when said ratio exceeds a predetermined value.

5. The system as recited in claim 2, further including second determining means for determining the ratio of reflected energy to incident energy for successive pulses and generating a shutdown signal when said ratio exceeds a predetermined value.

6. The system as recited in claim 5, further including a switch for selectively engaging said first or second determining means to said shutting down means.

7. The system as recited in claim 1, wherein said first measuring means includes an energy meter.

8. The system as recited in claim 1, wherein said second measuring means includes an energy meter.

9. The system as recited in claim 1, wherein said first measuring means includes a photodetector.

10. The system as recited in claim 1, wherein said second measuring means includes a photodetector.

11. The system as recited in claim 1, wherein said third measuring means includes a photodetector.

12. The system as recited in claim 1, wherein said shutting down means includes a Q-switch.

13. The system as recited in claim 1, wherein said shutting down means includes a Pockels cell.

14. A system for protecting a circuit which includes a stimulated Brillouin scattering (SBS) cell, the system comprising:

measuring means for measuring breakdown of said SBS cell; and means responsive to said measuring means for shutting down said optical circuit when a breakdown is detected.

15. The system as recited in claim 13, wherein said measuring means measures acoustic signals from said SBS cell.

16. The system as recited in claim 13, wherein said measuring means is disposed generally at the focus of the beam in said SBS cell for detecting any white light emitted from the plasma resulting from breakdown of the SBS cell.

17. A method for protecting an optical circuit which includes an SBS cell from optical damage as a result of a multi-mode input, the method comprising the steps of:

(a) measuring the energy through said SBS cell for at least two successive pulses; and (b) shutting down said optical circuit if the energy change between successive pulses exceeds a predetermined value.

18. The method as recited in claim 17, wherein said energy is said transmitted energy.

19. The method as recited in claim 18, wherein said energy is said reflected energy.

20. In connection with a phase conjugated master oscillator power amplifier (PC MOPA) which includes a master oscillator and a stimulated Brillouin scattering (SBS) cell, a system for protecting the PC MOPA from optical damage due to a multi-mode input, the system comprising:

one or more energy detectors; disposed to measure energy at preselected points in said PC MOPA; and a circuit for determining if the change in energy as measured by said one or more energy detectors varies by more than a predetermined amount for successive pulses and generating a shutdown signal; and a shutdown device for shutting down said master oscillator in response to said shutdown signal.

21. The system as recited in claim 20, wherein one of said one or more energy detectors are adapted to measure transmitted energy to said SBS cell.

22. The system as recited in claim 20, wherein one of said one or more energy detectors are reflected to measure reflected energy to said SBS cell.

23. The system as recited in claim 20, wherein one of said one or more energy detectors are used to measure incident energy to said SBS cell.

24. The system as recited in claim 20, wherein said shutdown device includes a shutter and a Q-switch driver.

25. The system as recited in claim 20, wherein said shutdown device includes a Pockels cell.

26. The system as recited in claim 20, wherein said one or more energy detectors includes an acoustic detector.

27. The system as recited in claim 20, wherein said white light detector device includes a photodetector.

28. A system for preventing multi-mode operation of an injection seeded laser comprising:

means for detecting the pulse build up time of said injection seeded laser oscillator; and means for shutting down said injection seeded laser oscillator as a function of said pulse build up time.

29. The system as recited in claim 28, wherein said shutting down means includes a Q switch.

30. The system as recited in claim 29, wherein said shutting down means includes a Pockels cell.

31. The system as recited in claim 29, wherein said shutting down means includes a shutter.

* * * * *